United States Patent
Bouskila

(10) Patent No.: US 6,601,577 B2
(45) Date of Patent: Aug. 5, 2003

(54) CONTAINER ASSEMBLY FOR WARMING BEVERAGES AND METHOD OF FORMING AND USING IT

(76) Inventor: Moshe Bouskila, 2056 E. 21$^{st}$ St., Brooklyn, NY (US) 11229

( * ) Notice: Subject to any disclaimer, the term of this patent is extended or adjusted under 35 U.S.C. 154(b) by 40 days.

(21) Appl. No.: 09/828,074

(22) Filed: Apr. 6, 2001

(65) Prior Publication Data

US 2002/0144676 A1 Oct. 10, 2002

(51) Int. Cl.$^7$ ................................................. A47J 36/28
(52) U.S. Cl. ................................... 126/263.08; 206/222
(58) Field of Search .......... 126/263.01, 263.05–263.09; 62/4; 206/222

(56) References Cited

U.S. PATENT DOCUMENTS

| | | | |
|---|---|---|---|
| 2,157,169 A | 5/1939 | Foster | |
| 2,288,895 A | 7/1942 | Fink | |
| 2,515,840 A | 7/1950 | Rodeck | |
| 2,653,610 A | 9/1953 | Smith | |
| 2,653,611 A | 9/1953 | Smith | |
| 2,721,552 A | 10/1955 | Nosik | |
| 2,898,744 A | 8/1959 | Robbins | |
| 2,907,173 A | 10/1959 | Robbins | |
| 2,916,886 A | 12/1959 | Robbins | |
| 3,970,068 A | 7/1976 | Sato | |
| 4,751,119 A | 6/1988 | Yukawa | |
| 4,762,113 A | 8/1988 | Hamasaki | |
| 4,793,323 A | 12/1988 | Guida et al. | |
| 4,809,673 A | 3/1989 | Charvin | |
| 4,895,135 A | 1/1990 | Hamasaki | |
| 4,989,729 A | 2/1991 | Huang | |
| 5,299,556 A | 4/1994 | Ando | |
| 5,626,022 A | * 5/1997 | Scudder et al. | 126/263.01 |
| 5,628,304 A | * 5/1997 | Freiman | 126/263.05 |
| 5,692,644 A | 12/1997 | Gueret | |
| 6,338,252 B1 | * 1/2002 | Calderaio | 126/263.08 |
| 2001/0029741 A1 | * 10/2001 | Peters et al. | 126/263.08 |

FOREIGN PATENT DOCUMENTS

WO    WO-01/24672 A1 * 4/2001

* cited by examiner

Primary Examiner—Sara Clarke
Assistant Examiner—James G. Barrow
(74) Attorney, Agent, or Firm—Steven Horowitz

(57) ABSTRACT

A container assembly having a generally cylindrical container for warming beverages includes a flexible closed bottom, a lower compartment and a water compartment. A generally U-shaped cup that holds beverage and has a cover has an upper portion that fits snugly with an upper perimeter of the container and a lowest portion that extends below the surface of the water. Extending from the bottom upward is a lower compartment for a salt compound covered by a pierceable foil partition. Perpendicular to the bottom is an annular central divider with a sufficiently sharp upper edge for piercing the partition when pressure is applied to the flexible bottom. The salt stored between the annular central divider and the lower compartment outer wall dissolves in the water upon shaking. The exothermic reaction warms the beverage to ideal temperature because of the proportion of water and salt set for each kind of beverage.

3 Claims, 6 Drawing Sheets

CONTAINER ASSEMBLY FOR WARMING BEVERAGES AND METHOD OF FORMING AND USING IT

The field of this invention includes devices for warming beverages prior to consumption and in particular it includes portable self-contained devices for this purpose.

BACKGROUND OF THE INVENTION AND DISCUSSION OF THE PRIOR ART

Self-warming containers for beverages have been known a comparatively long time. Early devices used incendiary or pyrotechnic materials as a heat source, and thus were only suitable for field use by troops or others whose background or training enabled them to safely handle such units, and were not suited for general consumer use or use in confined spaces such as motor vehicles or workplace lunchrooms.

A comparative improvement was achieved by the use of self-contained exothermic reactions in the liquid phase, reaching lower temperatures and generating a lesser amount of gas byproducts, or no gas at all, rendering them more suitable for widespread consumer use. These devices typically employed a hygroscopic salt or mineral, such as "quicklime" or CaO (calcium oxide) with a vigorous hydration reaction with water, which must have suggested early on the idea of employing quicklime as a chemical food heater.

Nonetheless, despite numerous entries in the field, the widespread prevalence of situations where a need for a hot beverage is perceived but in which no satisfactory method exists to fulfill that need, by inspection of the marketplace, demonstrate no existing product has successfully met the combined requirements of low retail cost, simplicity of use and manufacture, adequate safety, convenience and effectiveness in warming beverages to their ideal temperature. Safety, low cost and simplicity of use are likely to be important factors affecting consumers' decision to purchase a container assembly that warms a cup of coffee or other beverage. Accordingly, there remains an unsatisfied need for improved portable warming devices that perform with adequate safety, simplicity and cost-effectiveness and can provide hot beverages to individuals on the move or away from cooking facilities.

In heating beverages by an exothermic reaction occurring in a closed container, a means must be provided of initiating that reaction. Typically this is achieved by providing two reactants in physically separate compartments with a partition between the compartments which is breached by some mechanical means in order to activate the device. This method in general creates some opposing design objectives. On the one hand the method of breaching the partition should be mechanically simple and reliable. On the other hand it is undesirable to allow a significantly exothermic reaction to proceed by means of a simple trigger which may be inadvertently activated since that would result in danger from unexpected heat and would cause immediate heat dissipation rendering the container assembly useless. While the possibility of inadvertent activation may be prevented by including in the device multiple safety interlocks, e.g., elements of the device which must be removed or manipulated prior to initiating the exothermic reaction, the inclusion of such interlocks contravenes the goal of simplicity of manufacture, and hence low cost, and the goal of simplicity of operation and hence convenience and appeal.

U.S. Pat. No. 3,970,068 to Sato, for example, teaches an internal plunger which is actuated by pushing in a dimple or raised area on a bottom of a self heating can, the plunger thereby piercing an internal hemispherical partition between compartments containing solids and liquid. To prevent unintended actuation, Sato also teaches a second or false bottom on the can, which must be removed to expose the dimple prior to activating the can. This second or false bottom complicates the design, yet is rendered necessary to protect the dimple and underlying plunger, lest they be inadvertently depressed or activated by a child, and cause rapid and unexpected high temperatures.

In U.S. Pat. No. 4,528,218 to Maoine the reaction follows an immediate and complete mixing of the two reactants upon actuation of the device. Thus unintended depression of the activating area or unmonitored operation by a child would immediately generate high temperatures.

U.S. Pat. Nos. 4,762,113 and 4,895,135 to Hamasaki disclose devices incorporating at least one primary water bag partially surrounding an inner beverage container and normally concealed and protected by an outer shell, on removal of a section of which shell, a protruding corner of the bag is exposed, and the bag may be ruptured by a pull on this corner of the bag. This method requires significant manual dexterity to activate; a thin corner of the bag must be grasped with possibly wet or cold fingers and pulled with sufficient force to rupture the bag. This method may also be perceived as less than a fully aesthetic solution by some consumers, since a corner of the water bag continues to protrude from between inner and outer shells or containers after activation.

U.S. Pat. No. 4,809,673 to Charvin discloses a self-contained apparatus for heating food containers having reagents initially separated from one another by at least one watertight partition. The partition is breakable by a rod mounted with radial cutting blades, which blades may be caused to breach the partition by rotation of the rod by an attached rotary control knob protruding from an outside surface of the apparatus. The device in Charvin has cutting blades and is not a low-cost disposable consumer item.

To design a device which is both simple and easy to activate and achieves a reaction going to completion upon full activation, yet simultaneously is comparatively secure against the danger of unintended full activation leading to high temperatures or heat dissipation is not easy. In fact, it appears internally contradictory since a device which readily achieves complete reaction and is not cumbersome to use or manufacture would apparently be one which is only tenuously protected from unintended activation.

Another desirable feature of a portable device for warming beverages, which feature is not well represented in the prior art, is an attention to an optimal temperature and heating rate for various varieties of beverages. For example, the ideal temperature for coffee may be different from that for tea, chocolate milk, soup or baby formula. Furthermore, the ideal rate of heating may be different for each comestible. It should also be noted that a less viscous and purely liquid beverage such as coffee or tea can be heated quicker to ideal drinking temperature since internal convection in the liquid will tend to distribute the thermal energy and prevent local flavor-destroying hot spots or boiling. In contrast, a thicker and partially solid beverage such as soup, must be heated more gradually in order to prevent burning or charring of the contents.

Other prior art devices, moreover, behave in an "all or nothing" manner, combining reactants in a pre-determined way upon activation, without further user intervention. It is out of the user to control either the final temperature or the rate of heating. Accordingly, there exists a need for a simple portable and self contained food warming device which overcomes the disadvantages of the prior art, provides some control over final temperature and heating rate, is safe, is simple to manufacture and contains few moving parts.

SUMMARY OF THE INVENTION

The present invention overcomes the disadvantages of the prior art and offers new advantages. The present invention provides a container assembly having a generally cylindrical container for warming beverages and it includes a flexible closed bottom, a lower compartment and a water compartment. Also included is a generally U-shaped cup that holds the beverage that the user wants to drink warm and has a cover. The cup has an upper portion that fits snugly with an upper perimeter of the container and a lowest part that extends below the surface of the water in the water compartment. Extending from the bottom of the container assembly upward is a lower compartment for a salt compound, preferably calcium chloride, covered by a pierceable partition, typically foil. Perpendicular to the bottom and located in the lower compartment is an annular central divider with a sufficiently sharp upper edge for piercing the partition when pressure is applied to the resilient bottom. The precalculated amount of salt stored in the lower compartment, typically between the annular central divider and the lower compartment outer wall, begins to mix with the water upon the piercing of the partition, and upon shaking of the container assembly it fully mixes with the water and dissolves in it. The exothermic reaction warms the beverage to ideal temperature because of the proportion of water and salt compound and the amount of water set for each kind of beverage.

IMPORTANT OBJECTS AND ADVANTAGES

The following important objects and advantages of the present invention are:

(1) to provide a container assembly for heating beverages;

(2) to provide a container assembly for warming beverages that is self-contained and that is portable;

(3) to provide a container assembly that heats particular beverages to the temperature that is ideal with respect to that beverage;

(4) to provide a container assembly for warming beverages that can be used for a wide selection of beverages;

(5) to provide a container assembly for warming beverages that is simple to use and simple to manufacture;

(6) to provide a container assembly for warming beverages that protects against unintended heating of the beverage or of the container assembly through a two-step heating process;

(7) to provide a container assembly for warming beverages that protects against creating unintended high temperatures in the hands of children;

(8) to provide a container assembly for warming beverages that allows a consumer to drink the beverage at a desirable temperature whenever the consumer wishes to rather than immediately after receiving the warm beverage;

(9) to provide a container assembly for warming beverages that allows a consumer the freedom of movement that comes with not having to limit one's location to places that offer warming facilities or that offer warm beverages;

(10) to provide a container assembly that includes a generally cylindrical container, a flexible closed bottom, a lower compartment extending from the bottom upward; a water compartment with water, a generally U-shaped cup that holds a particular beverage that needs to be warmed in an interior of the cup, a cover for the cup, and a salt compound;

(11) to provide a container assembly that has a cup having an upper portion that fits snugly with an upper perimeter of the container and wherein the cup is made of a heat transmitting material and is sufficiently rigid to withstand penetration of salt water into the interior of the cup;

(12) to provide a container assembly that has a lower compartment being bounded above by a pierceable partition, and that has an annular central divider in the lower compartment perpendicular to the resilient closed bottom and having a sufficiently sharp upper edge for piercing the partition when a manual pressure is applied upwardly to the resilient bottom;

(13) to provide a container assembly that has a salt compound stored in a lower compartment between a divider and an outer wall of the lower compartment in an amount measured so that the container assembly warms the particular beverage to a specified temperature that is ideal for consumption;

(14) to provide a method of making a container assembly for warming beverages, comprising forming from a mold a generally cylindrical plastic container having an open top, a bottom and a lower compartment extending upward from the bottom with an annular central divider perpendicular to the closed bottom, placing a salt compound in the lower compartment between the divider and a lower compartment outer wall covering the salt and the lower compartment with a partition that is pierceable, pouring water into the water compartment, placing in the container a cup whose upper portion fits snugly with an upper perimeter of the container and putting a cover on the cup and container assembly;

(15) to provide a container assembly for warming beverages using calcium chloride as a salt compound;

(16) to provide a container assembly for warming between approximately two and one half ounces to approximately three and one half ounces of coffee using an exothermic reaction generated from a solution of approximately 7.5 grams of calcium chloride in approximately 9.5 milliliters of water;

(17) to provide a container assembly for warming between approximately two and one half ounces to approximately three and one half ounces of chocolate milk using an exothermic reaction generated from a solution of approximately 9 grams of calcium chloride in approximately 9.2 milliliters of water;

(18) to provide a container assembly for warming between approximately two and one half ounces to approximately three and one half ounces of tea using an exothermic reaction generated from a solution of approximately 7.5 grams of calcium chloride in approximately 9.5 milliliters of water;

(19) to provide a container assembly for warming between approximately two and one half ounces to approximately three and one half ounces of soup using an exothermic reaction generated from a solution of approximately 9.0 grams of calcium chloride in approximately 9.2 milliliters of water;

(20) to provide a container assembly for warming beverages without the need for an external source of heat; and

(21) to provide a container assembly for warming beverages wherein the user has some control over the rate of the heating of the beverage.

Still other objects, features and advantages of the invention, will be apparent from the following description of the preferred embodiments and the accompanying drawings.

DETAILED DESCRIPTION OF THE PREFERRED EMBODIMENT

Figure 1:
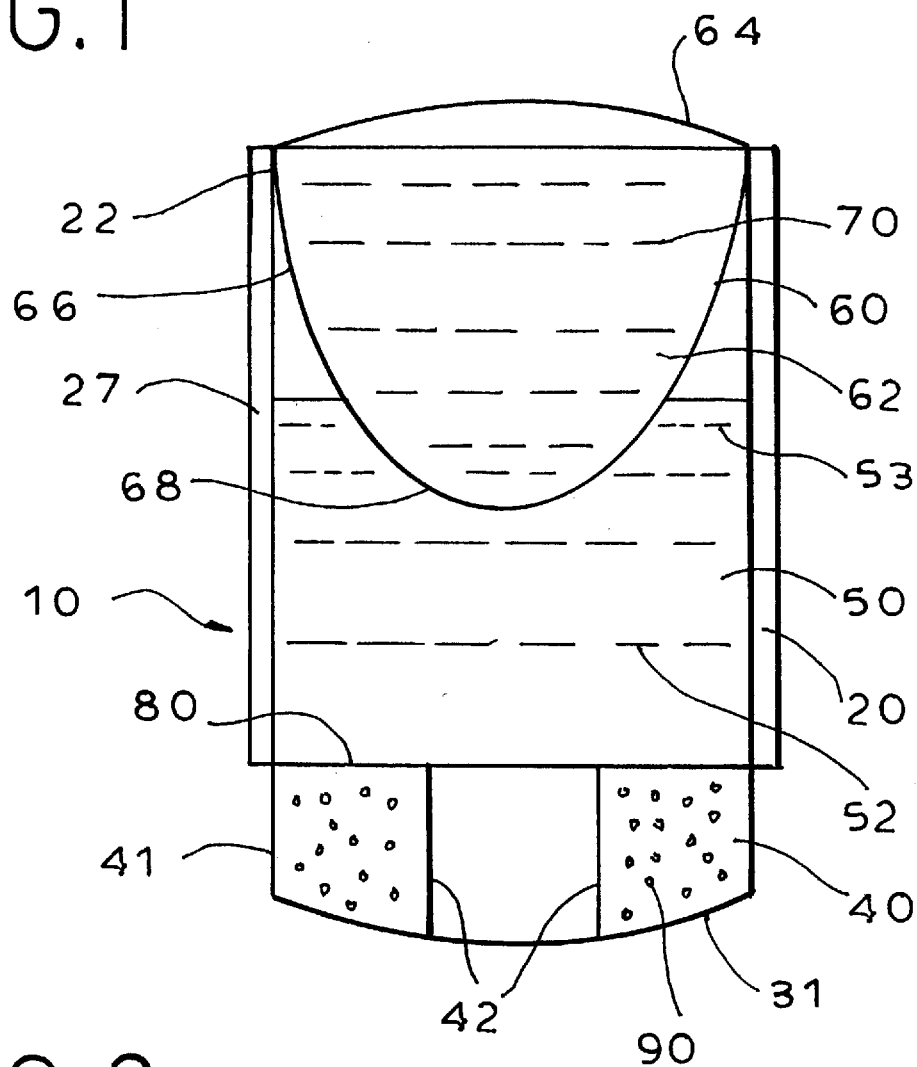
FIG. 1 is a schematic front view partly broken away of the container assembly of the present invention and shown prior to activation.

In this patent application the term "warming" refers broadly to heating to a suitably warm temperature and includes warm or hot, whichever is suitable for drinking the particular beverage involved. Furthermore, in this application the term "beverage" includes foodstuffs such as soups or other foodstuffs that are part liquid and part solid.

In order to better understand the present invention in conjunction with the drawings of FIGS. 1–4, the overall container assembly of the present invention has been assigned reference numeral 10 and its elements are described and assigned the reference numerals identified below.

Figure 2:
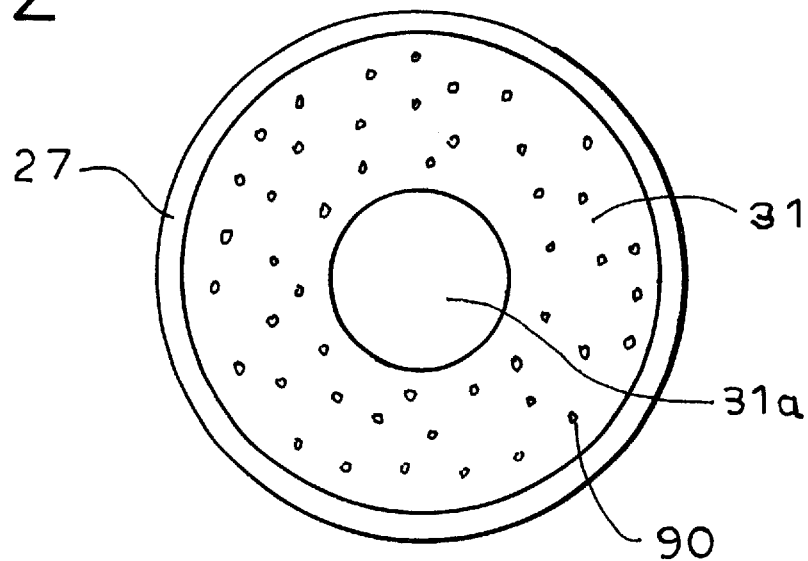
FIG. 2 is a bottom view of the container assembly of the present invention.

As best seen in FIGS. 1–3, container assembly 10 is for warming beverages to temperatures that are ideal for consumption so that a consumer need not limit their presence to locations having warming facilities and need not drink the beverage immediately upon receiving it.

Figure 2A:
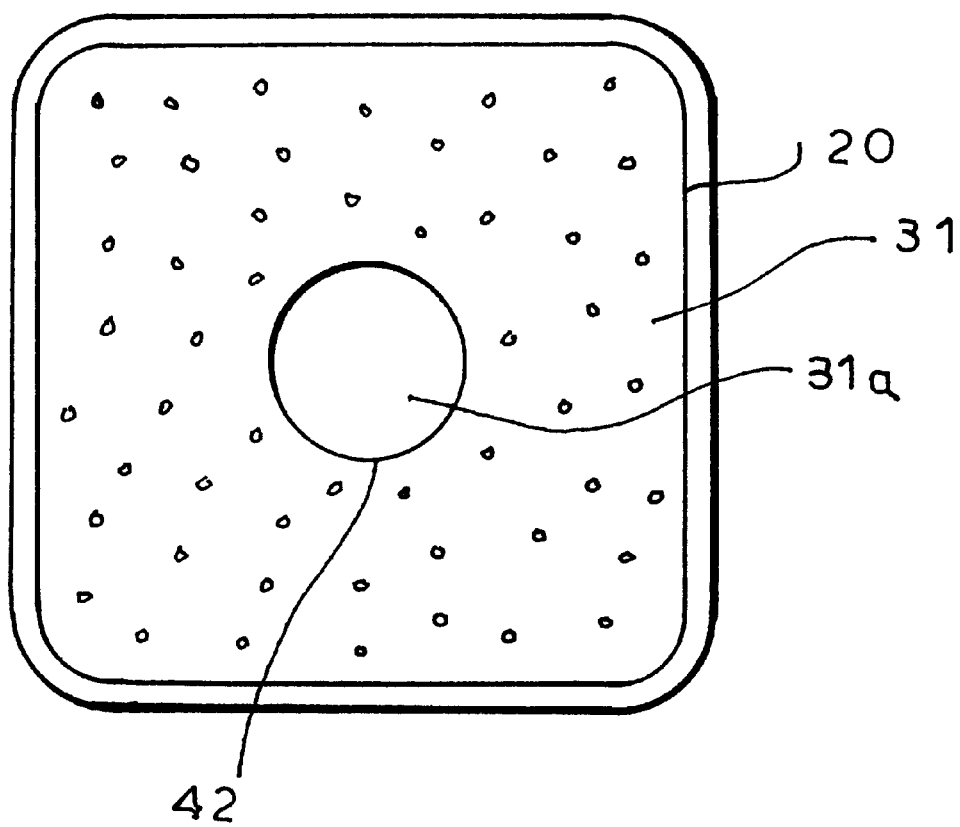
FIG. 2A is a top view of an alternative embodiment of the container assembly of the present invention.

Container assembly 10 comprises a generally cylindrical container 20, a flexible closed bottom 31 and it includes a lower compartment 40 extending from the bottom 31 upward until partition 80. Also included in container assembly 10 is a water compartment 50 including a first amount of water 52 sitting on partition 80, which water has water surface 53 at its top. Typically, although not necessarily, water surface 53 is sufficiently above a lowest point of cup 60 so that enough water 52 contacts the outer surface of cup 60 for purposes of heating. This is not necessary though since, as explained further below, container assembly 10 is turned upside down as part of the heating process. As seen in FIG. 2A, in an alternative embodiment, container 20 may be substantially rectangular so long as it is sufficiently rounded along its "corners" so that it is comfortable to grasp.

The entire container assembly 10 with the exception of salt compound 90, water 52, beverage 70 and partition 80 is made of a plastic material, preferably from one mold. Accordingly, the container assembly 10 will be flexible since the bottom 31 is flexible.

Container assembly 10 also includes generally U-shaped cup 60 that holds a particular beverage 70 that needs to be warmed in an interior 62 of the cup 60. The phrase "generally U-shaped" intended to be interpreted flexibly in that the cup 60 nay be of any shape so long as most of the height of the cup is narrower than the perimeter of container 20 so that water can be situated between cup 60 and a wall of container 20. Cup 60 has a cover 64 that also functions as a cover for container 20 and for container assembly 10. The beverage 70 in the cup 60 is preferably vacuum packed and hermetically sealed in order to maximize the freshness and longevity of the beverage 70. Beverages 70 stored in this way can be held even for months if desired.

Cup 60 has an upper portion 66 that fits snugly with an upper perimeter 22 of container 20, a remaining lower portion that is narrower than container 20. As stated, a lowest portion 68 of cup 60 may extend below the water surface 53 of water 52 when container assembly is upright. In any case, the amount of water 52 is such that cup 60 is in sufficient contact with the water 52 so as to absorb significant heat from the water 52 at least when the container assembly 10 is turned upside down. Cup 60 is made of a heat transmitting material, and cup 60 is sufficiently thick and rigid to withstand penetration of salt water into the interior 62 of the cup 60. Lower compartment 40 is bounded above by a pierceable partition 80. Obviously, cup 60 must be large enough to house the quantity of beverage 70 being warmed.

Partition 80 is preferably made of a foil material such as aluminum foil but may be made from any suitable material that is easily pierced by a sharp edge and that has sufficient rigidity so that after being pierced it remains substantially in place. Annular central divider 42 in lower compartment 40 is substantially perpendicular to bottom 31 for piercing purposes and has a sufficiently sharp upper edge 44 for piercing the partition 80 when a manual pressure is applied upwardly to the flexible bottom 31.

Partition 80 is attached to the inner walls of container 20 by any suitable means that is secure and is stable enough not to react significantly with water 52 above partition 80. Adhesive may be used.

Annular divider 42 is preferably slightly lower than partition 80 and annular divider 42 does not reach the top of lower compartment 40 in order to ensure that annular divider 42 does not pressure partition 80. Accordingly, this avoids accidental premature rupture of partition 80. Obviously, the amount of millimeters that annular divider 42 is lower than partition 80 is significantly less than the distance bottom 31 travels when manual pressure is applied to it, thus ensuring that partition 80 is effectively ruptured when such pressure is applied. The curvature of bottom 31 assures that bottom 31 sufficiently deforms the required distance when upward manual pressure is applied to it.

Salt compound 90 is stored in the lower compartment 40. Typically, although not necessarily, salt compound 90 is stored between the annular central divider 42 and a lower compartment outer wall 41 (which lower compartment outer wall 41 also forms part of the outer wall 20a of container 20) in a second amount defined in proportion to the first amount of water 52 and sufficient to heat the quantity of the particular beverage 70 to a specified temperature that is ideal for consumption when the salt 90 mixes with the water 52 after the foil partition 80 is pierced and the container assembly 10 shaken. Obviously, the salt compound 90 is also not so much in quantity that it is beyond the saturation point of the water. Salt compound 90 may also be stored throughout lower compartment 40, meaning also inside of annular divider 42 and not just between annular divider 42 and lower compartment outer wall 41.

Figure 4:
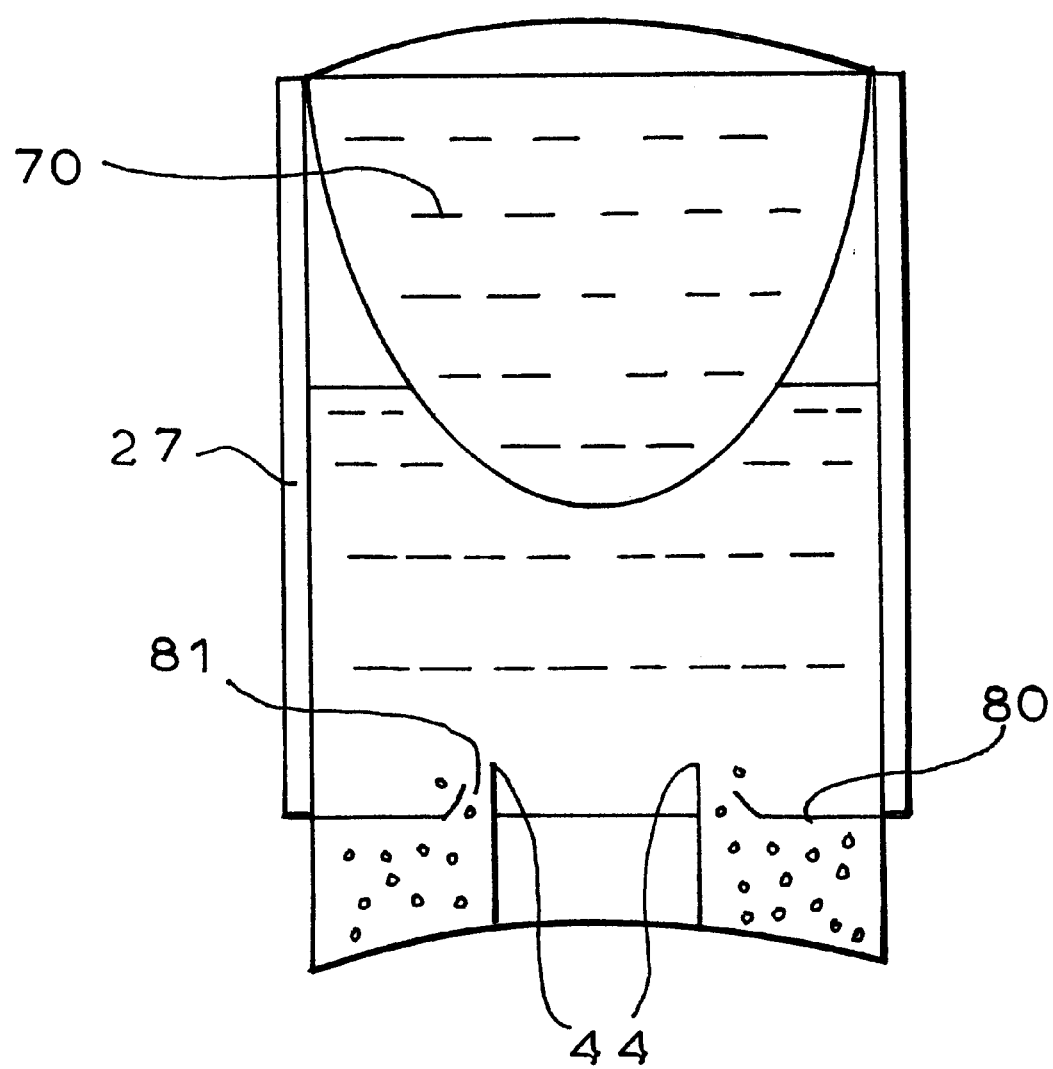
FIG. 4 is a partial front plan view partly broken away of the container assembly of the present invention after partial activation.

Ideally, although not necessarily, the amount of salt compound 90, which has been precalculated in relation to the type and quantity of beverage 70, reaches to the top of lower compartment 40 so that salt compound 90 is compact enough that it does not easily mix with water 52, as seen in FIG. 4, until shaking of container assembly 10 is performed, as explained further below. However, strictly maintaining the requirement that salt 90 reach the top of lower compartment 40, however, may result in requiring differently made container assemblies 10 for different beverages and amounts of beverage to be warmed.

The salt compound 90 is preferably calcium chloride but may also be any of a number of other salt compounds that generate sufficient heat when dissolving in the amount of water (at approximately room temperature) so they can be used by the method/apparatus of the present invention. A "salt compound" as used herein means any stable compound formed from a chemical reaction between an acid and a base. The term "salt compound" as used herein is also to be limited to those salt compounds that are suitable for the method and apparatus described, for example in that they would not be toxic, would not be able to corrode or break through cup 60 that forms the barrier between the beverage 70 to be drunk and the solution of salt 90 and water 52, and not be able to corrode or break through partition 80 when stored in lower compartment 40.

The size of the granules of the calcium chloride should not be critical. The size of the granules of calcium chloride tested to calculate the quantities needed for ideal drinking temperate, as described below, are somewhat larger in diameter than fine granules of, say, table salt—and were between approximately one sixteenth of an inch and approximately one eight of an inch. For granules of calcium chloride of smaller or larger diameter, however, the exothermic reaction would only be marginally faster or slower, respectively, if at all, and marginally less or more heat dissipation and hence result, arguably, in a different final temperature of beverage 70, but this difference would be insignificant and have no meaningful effect on the amounts of calcium chloride to be added to the volume of water 52. With respect to other salt compounds 90 used, their granule size for use in container assembly 10 would be the size that such compound 90 is normally sold in and any difference in exothermic reaction caused by a difference in granule size would have at most a negligible affect, if any, on the ideal number of grams to be placed in the container assembly 10 in relation to the amount of water 52. It would not otherwise affect the method or apparatus of the present invention.

The following has been determined to be the amounts of water 52 and calcium chloride (when calcium chloride is used as the salt compound 90) in the present invention to reach the ideal temperature for consumption using container assembly 10 of the present invention after activation by piercing and after shaking. The container assembly 10 having a height of approximately three and a half inches was used with cup 60 therein holding approximately three ounces of coffee. For either tea or coffee, there is approximately 7.5 grams of calcium chloride 90 needed for approximately 9.5 milliliters of water 52 to warm between approximately two and one half and approximately three and one half ounces of coffee or tea 70 in container assembly 10. If the amount of beverage 70 is increased (or decreased) the amounts of salt 90 and water 52 would have to be increased (or decreased) proportionately to reach the same ideal temperature. In addition, the absolute amount of water 52 cannot exceed the size of water compartment 52 and should in fact be small enough to leave room for shaking.

With respect to chocolate milk all the above factors are identical except for the quantities of salt compound 90 and water 52 used to heat the beverage 70. For the between approximately two and one half to approximately three and one half ounces of chocolate milk or soup 70 there is approximately 9.0 grams of calcium chloride and there is approximately 9.2 milliliters of water. The term "approximate" used with respect to each of these above quantities of salt compound 90 and water 52 means plus or minus ten per cent.

For tea, coffee, soup or chocolate milk the amount of beverage 70 being warmed by the quantities of salt 90 and water 52 given is approximately three ounces (between approximately two and one and approximately three and one half) ounces. Preferably, the amounts of beverages 70 should be between approximately two and three quarters and approximately three and one quarter ounces for the amounts of salt 90 and water 52 stated above. If the quantity of beverage 70 is more than three and one half ounces or less than two and one ounces then the amount of salt 90 and the amount of the water 52 should be increased or decreased proportionate to the increase or decrease in the amount of beverage 70.

With respect to the quantities of salt compound if salt compound 90 other than calcium chloride is used, the only difference is that to arrive at the quantities for a given salt compound 90 it is necessary to compare the heats of solution (heat generated by dissolving in water) of the selected salt compound with the heat of solution of calcium chloride. A salt compound that generates more heat when dissolving in water would require that much fewer grams to be used to reach the same temperature of beverage 70. Accordingly, to arrive at the quantities of salt compound 90 (other than calcium chloride) needed to warm between approximately two and one half ounces to approximately three and once half ounces of beverage 70 using the quantity of water 52 previously described for calcium chloride, one need only take the quantities given for calcium chloride and adjust them for the ratio of heats of solution given in calories per gram between the particular salt compound used and calcium chloride. This can be generalized for all salt compounds used to warm between approximately two and one half and approximately three and one half ounces of tea and coffee by the present method and apparatus as follows: for the ideal proportion the approximate number of grams of the salt compound 90 to be used with approximately 9.5 milliliters of water is equal to 7.5 times HS1 divided by HS2, where HS1 represents the heat of solution of calcium chloride and HS2 represents the heat of solution of that salt compound in water.

Likewise, for salt compounds used for warming between approximately two and one half and approximately three and one half ounces of soup or chocolate milk in accordance with the method and apparatus of the present invention, it can be stated that for the ideal amount the approximate number of grams of the salt compound 90 to be used with the approximately 9.2 milliliters of water is equal to 9.0 times HS1 divided by HS2, where HS1 represents the heat of solution of calcium chloride and HS2 represents the heat of solution of that salt compound in water.

The water 52 in water compartment 50 is preferably at approximately room temperature.

Container assembly 10 also includes an outer layer 27 which is an extra layer of heat insulating plastic. Outer layer 27 surrounds container 20 above the lower compartment outer wall 41. The purpose of outer layer 27 is to ensure that a person holding the container assembly 10 after activation and shaking is not burned, scolded or made uncomfortable since after the exothermic reaction goes to completion after shaking container 20 may become hot.

The Method of the Present Invention

The method of using container assembly 10 to warm a beverage is as follows. The container assembly 10 having the beverage 70 in cup 60 is taken in hand and manual upward pressure is applied to a central portion of the bottom 31 of the container assembly 10 so as to deform bottom 31. Bottom 31 in normal position is "convex" in that it is rounded outward when looking at it from the side. After pressure has been applied to the flexible bottom 31, the bottom 31 either has its convex shape permanently deformed to a concave shape so that the central portion of bottom 31 is higher than the peripheral portions of the bottom 31 or the deformation is temporary and bottom 31 bounces back to its original convex shape. FIG. 4 describes the situation after manual pressure has been applied to bottom 31. As seen in FIG. 4, in the event that the manual pressure permanently deforms bottoms 31, or the pressure deforms bottom 31 with sufficient stability and permanency that bottom 31 remains in deformed condition until further force is applied to it to reverse the deformity, the resulting shape of the deformed bottom 31 is an inversion of the curve of the bottom 30 of the container 30. The immediate result of the manual pressure on bottom 31 is to cause annular divider 42 to rupture foil partition 80 and thereby create a substantially annular hole 81 that allows salt compound 90 and water 52 to begin to mingle.

As illustrated by FIG. 4, the mere piercing of partition 80 will not lead to a rapid exothermic reacion because for several reasons the water 52 and the salt compound 90 will not fully mingle immediately. First, the size of the diameter of the salt compound 90 in relation to the hole 81 created in partition 80 will not result in immediate dissolution of the salt compound 90 in the water 52. Second, the salt compound 90 is relatively compacted in lower compartment 40 and not all or even most of the salt compound 90 can escape lower compartment 40 and be urged to immediately traverse hole 81 created in partition 80. Accordingly, it is necessary for the person holding the container assembly 10 to turn the container assembly 10 upside down (thus ensuring contact between cup 60 and water 52) and then to vigorously shake container assembly 10, thereby generating the full exothermic reaction desired, which reaction in turn causes the mixture of the salt compound 90 with water 52 to heat beverage 70 to the ideal temperature for consumption. The purpose of turning the container assembly 10 upside down before shaking is that it ensures that water 52 will come into contact with cup 60, and even if water 52 already is in contact with cup 60 when container assembly is held straight turning it upside down will ensure that cup 60 comes into maximum contact with water 52.

Beverage 70 should reach ideal temperature in approximately 20 to 30 shakes of average strength. The working assumption for the number of shakes, based on experimentation, is that the "ideal" drinking temperature for tea and coffee is between approximately 80 degrees and 87 degrees Fahrenheit and likewise the working assumption is that "ideal" drinking temperature for soup and chocolate milk is between approximately 85 degrees and 92 degrees Fahrenheit.

As best seen from FIGS. 3A, 3B, 3C, 3D, 3E, 3F, there is also disclosed herein a method of manufacturing a container assembly 10 for warming a beverage 70, comprising the following steps in order. The method is consistent with the physical characteristics of the elements of container assembly 10 previously described with respect to the apparatus 10:

(a) Form from a single mold a cylindrical plastic container 20 as described above and as seen in FIG. 3A which is preferably generally cylindrical and which has an open top, a closed flexible bottom 31 and a lower compartment 40 extending upward from the bottom 31. This lower compartment 40 includes a lower compartment outer wall 41 (which forms part of the outer wall 20a of the container 20 itself) and includes an annular central divider 42 in the lower compartment 40 substantially perpendicular to the bottom 31, the annular divider 42 having an upper edge 44 sufficiently sharp to pierce a partition that is to be placed, in a later step, on top of the lower compartment 40.

Figure 3A:
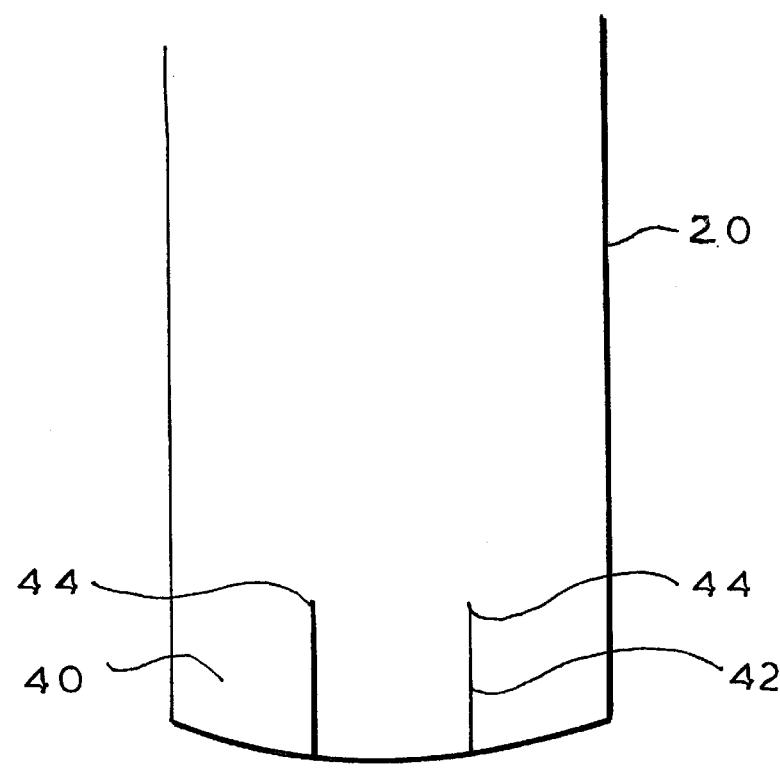
FIG. 3A, FIG. 3B, FIG. 3C, FIG. 3D, FIG. 3E, and FIG. 3F are each schematic front views partly broken away of the container assembly of the present invention in sequential stages of manufacture.
Figure 3B:
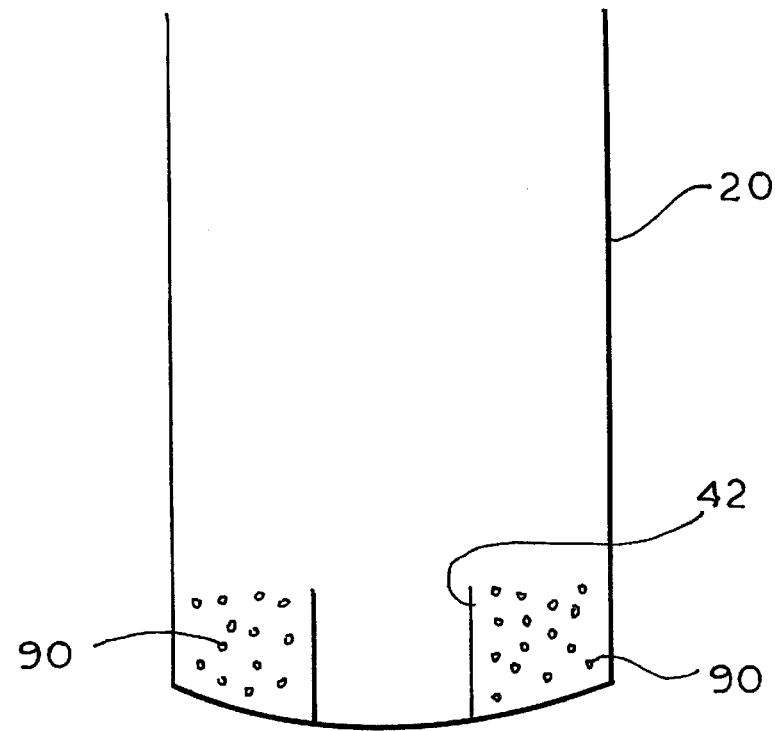

(b) Place a salt compound 90, preferably calcium chloride, in lower compartment, typically although not necessarily in an area of the lower compartment 40 between the annular central divider 40 and the lower compartment outer wall 41. Salt compound 90 is then higher than annular divider 42. The amount of salt compound 90 is defined to yield a mixture for that will warm a particular beverage 70 such as coffee, tea, chocolate milk, soup to the temperature best suited for drinking that beverage 70 when the remainder of the steps are performed. FIG. 3B shows the container 20 with the salt compound 90.

Figure 3C:
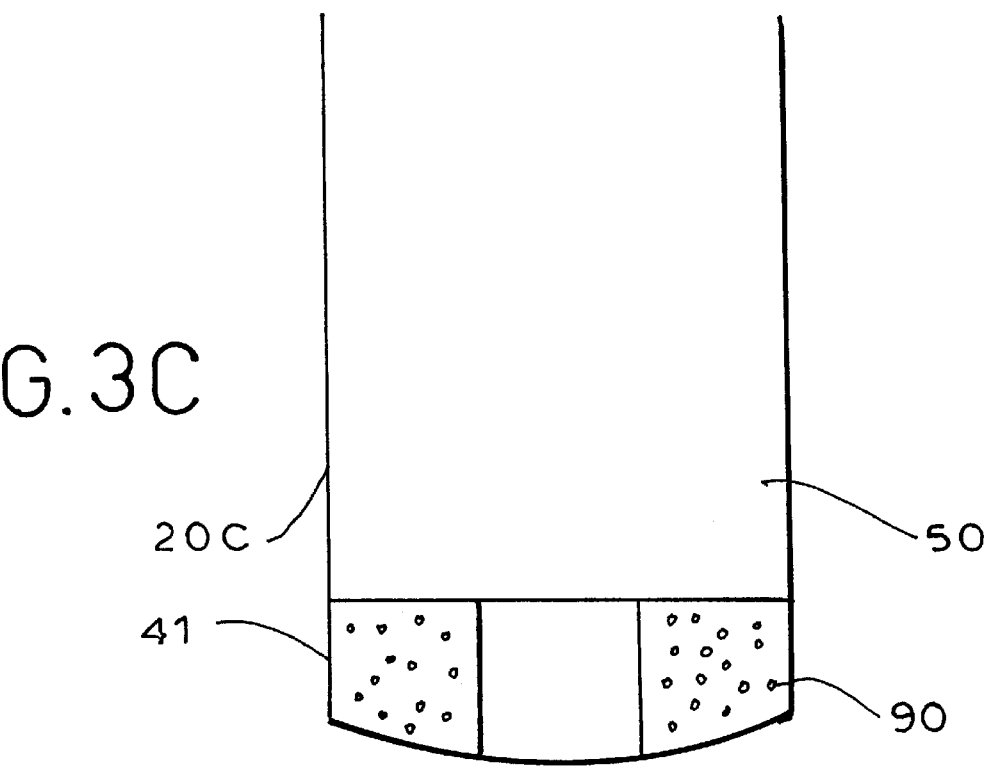

(c) Cover an inside of lower compartment 40 with a pierceable partition 80 made of a material, such as foil, that will separate the water compartment 50 from the salt compound 90 and which is sufficiently rigid to remain substantially in place after being pierced, as seen in FIG. 3C. This step is achieved preferably by a machine that puts partition 80 in place in a way that seals salt compound 90 in lower compartment 40, thereby preventing salt compound 90 from escaping into water compartment 50 unless and until partition 80 is ruptured by annular divider 42. However, partition 80 does not pressure slightly sharp upper edge 44 of partition 80 because annular divider 42 is lower than partition 80. Partition 80 supports its own weight by being attached to walls of container 20.

Figure 3D:
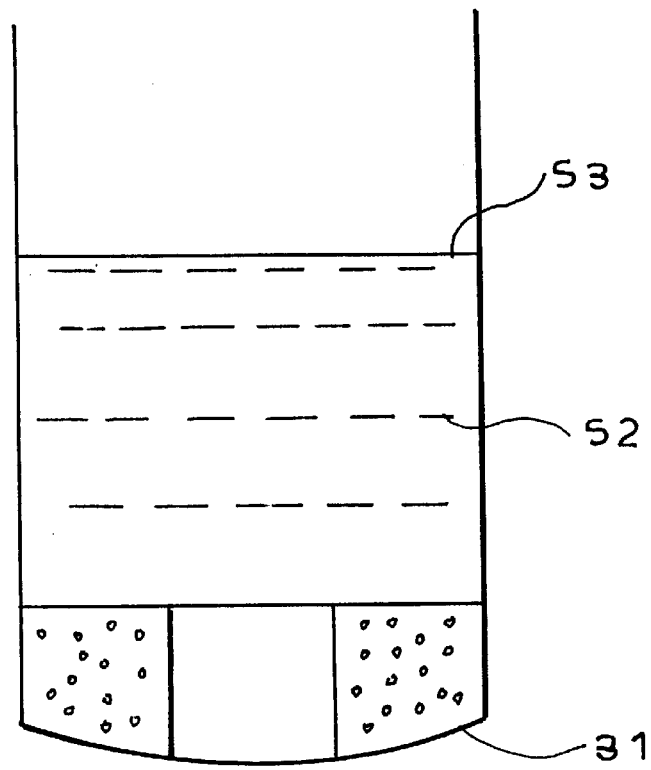

(d) Pour water 52 that has a water surface 53 (after being poured) into the water compartment 50, as seen in FIG. 3D, the first amount of salt compound 90 and the amount of water 52 defined in proportion to each other and defined sufficient to heat the quantity of the particular beverage 70 to a specified temperature that is ideal for consumption when the salt compound 90 mixes with the water 52.

Figure 3E:
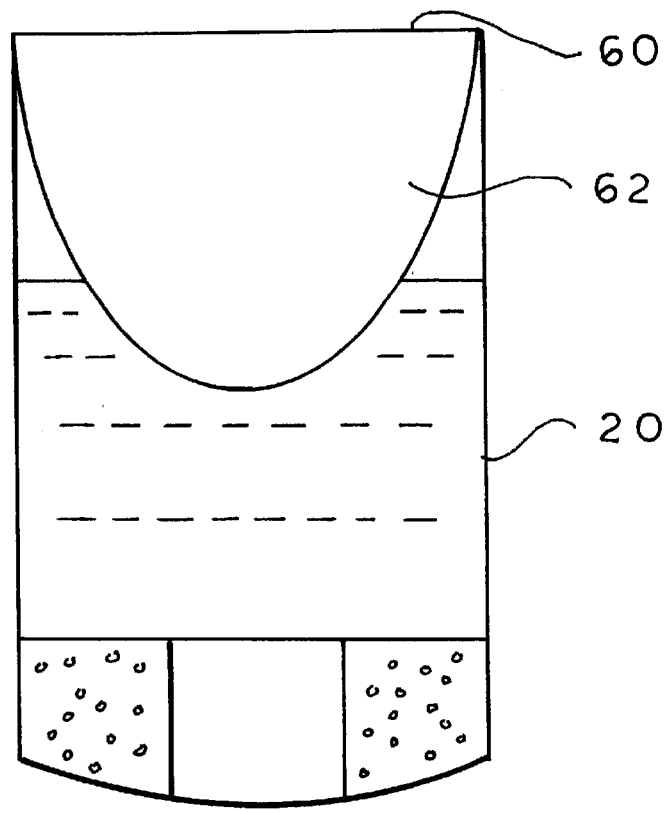

(e) Affix a generally U-shaped cup 60 capable of holding in an interior of the cup 62 a particular beverage 70 in need of being warmed. Cup 60 has an upper portion 66 that fits snugly with an upper perimeter 22 of the container. The remaining lower portion is narrower than the container including a lowest portion 68 that may extend below a surface 53 of water 52, as seen in FIG. 3E. The cup 60 is made of a heat transmitting material and is sufficiently rigid and thick to withstand penetration of salt water into the interior 62 of the cup.

(f) Place the particular beverage 70 that needs to be warmed into the interior of the cup so that the cup is substantially full with the beverage 70.

Figure 3F:
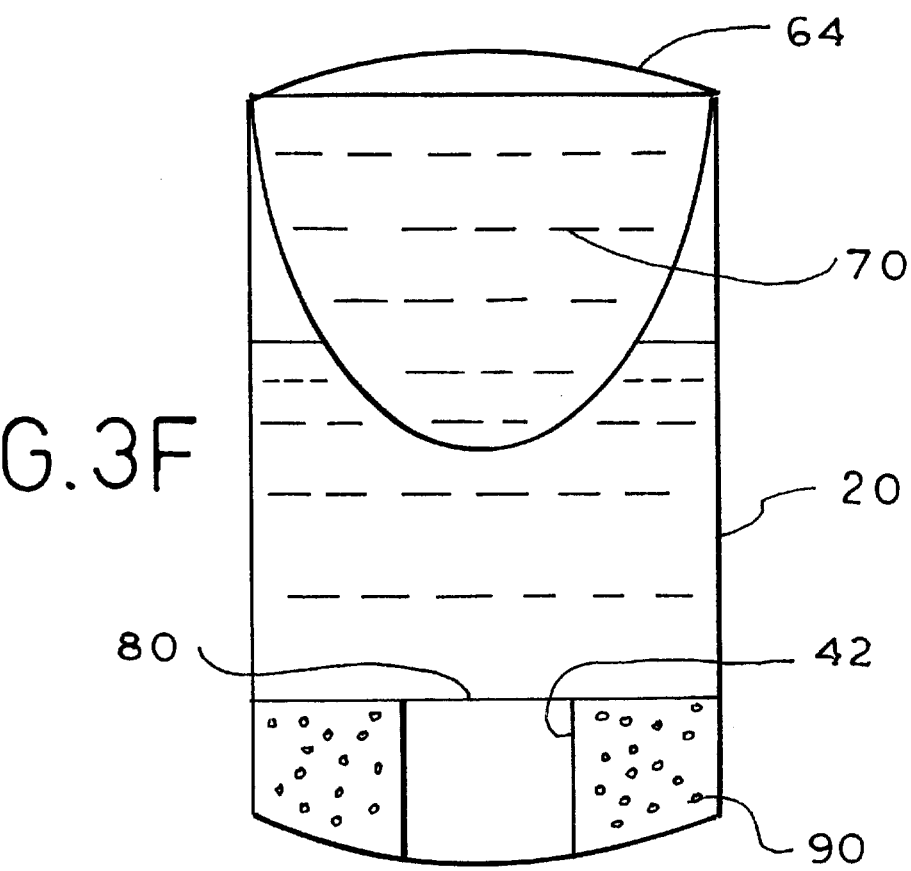

(g) Place a cover 64 on the cuo 60 (which in certain embodiments may also involve placing a cover on the container 20 and container assembly 10) as seen in FIGS. 1 and 3F, the container assembly allowing a user to manually pressure the bottom of the container to deform said bottom thereby causing the annular divider to pierce the partition and upon shaking the container assembly causing the salt compound to dissolve in the water thereby generating an exothermic reaction that warms the particular beverage to a specified temperature that is ideal for consumption. Preferably, the beverage 70 is poured into the cup 60 and the cover 64 placed on the cup 60 in a well known manner so that no air is allowed to get into the cup and a vacuum is maintained in the cup.

The method of the present invention for warming beverages in a self-container portable container assembly 10 described herein includes manually applying upward pressure to a central portion 31a of the bottom 31 of the lower compartment 40 to deform said bottom thereby causing the annular divider to pierce the partition and upon shaking the container assembly 10 to allow the salt compound 90 to mix with the water 52 to create an exothermic reaction and waiting for the beverage 70 to be warmed to a desired temperature.

FIG. 3A, FIG. 3B, FIG. 3C, FIG. 3D, FIG. 3E, and FIG. 3F are a series of sequential figures depicting schematic front views partly broken away of the container assembly 10 of the present invention in sequential stages of manufacture.

It should that the method and apparatus of the present invention can be used to warm beverages 70 of varying volumes, e.g. a cup of tea versus a pint of tea. If cup 60 is larger and the amount of beverage 70 is greater, then the amount of salt compound 90 and water 52 will be greater. The size of container assembly 10 would not have to be greater if there is more room in lower compartment 40 for additional salt compound 90.

Although the present invention has been described in terms of use for beverages (liquids or part liquids and part solids) it is also applicable to foodstuffs that are primarily solids.

It is to be understood that while the apparatus of this invention have been described and illustrated in detail, the above-described embodiments are simply illustrative of the principles of the invention. It is to be understood also that various other modifications and changes may be devised by those skilled in the art which will embody the principles of the invention and fall within the spirit and scope thereof It is not desired to limit the invention to the exact construction and operation shown and described. The spirit and scope of this invention are limited only by the spirit and scope of the following claims.

What is claimed is:

1. A container assembly for warming beverages, comprising:

a generally cylindrical container, a flexible closed bottom, a lower compartment extending from the bottom upward, a water compartment including a first amount of water, said water having a water surface, a generally U-shaped cup that holds a substantially full quantity of a particular beverage that needs to be warmed in an interior of the cup, the cup having a cover, and the cup having an upper portion that fits snugly with an upper perimeter of the container and a remaining lower portion that is narrower than the container, said cup made of a heat transmitting material, and said cup being sufficiently rigid to withstand penetration of salt water into the interior of the cup, the cup being in sufficient contact with the water so as to absorb heat from the water at least when the container assembly is turned upside down, the lower compartment being bounded above by a pierceable partition made of foil material, an annular central divider perpendicular to the bottom and having a sufficiently sharp upper edge for piercing the partition when a manual pressure is applied upwardly to a central portion of the flexible bottom sufficient to deform the bottom, a salt compound stored in the lower compartment between the annular central divider and a lower compartment outer wall, in a second amount defined in proportion to the first amount of water and sufficient to heat the quantity of the particular beverage to a specified temperature that is ideal for consumption when the salt mixes with the water after the partition of foil material is pierced and the container assembly is turned upside down and shaken, wherein the salt compound fills the lower compartment to a top of the lower compartment.

2. A method of manufacturing a container assembly for warming beverages, comprising the steps of:

(a) forming from a mold a generally cylindrical plastic container having an open top, a flexible closed bottom and a lower compartment extending upward from the bottom, said lower compartment including a lower compartment outer wall and including an annular central divider perpendicular to the closed bottom, the annular divider having an sufficiently sharp upper edge for piercing a partition, (b) placing a salt compound in the lower compartment in a first amount so that the salt compound is as high or higher than the annular divider, and so that the salt compound is placed in the lower compartment between the annular central divider and the lower compartment outer wall, (c) covering an inside of the lower compartment with a pierceable partition that divides a water compartment from the salt compound so that the annular divider is lower than the partition, (d) pouring an amount of water into the water compartment, said first amount of salt compound and said amount of water defined in proportion to each other and defined sufficient to heat the quantity of the particular beverage to a specified temperature that is ideal for consumption when the salt compound mixes with the water, (e) affixing a generally U-shaped cup capable of holding in an interior of the cup a particular beverage in need of being warmed, the cup having an upper portion that fits snugly with an upper perimeter of the container, said cup made of a heat transmitting material, and said cup being sufficiently rigid to withstand penetration of salt water into the interior of the cup, the cup being in sufficient contact with the water so as to absorb heat from the water at least when the container assembly is turned upside down, (f) placing a particular beverage that needs to be warmed in the interior of the cup, (g) placing a cover on the cup, the container assembly allowing a user to manually pressure the bottom of the container to deform said bottom thereby causing the annular divider to pierce the partition and upon shaking the container assembly causing the salt compound to dissolve in the water thereby generating an exothermic reaction that warms the particular beverage to a specified temperature that is ideal for consumption.

3. A container assembly for warming beverages, comprising:
- a generally rectangular container with substantially rounded corners,
- a flexible closed bottom,
- a lower compartment extending from the bottom upward,
- a water compartment including a first amount of water, said water having a water surface,
- a generally U-shaped cup that holds a substantially full quantity of a particular beverage that needs to be warmed in an interior of the cup, the cup having a cover, and the cup having an upper portion that fits snugly with an upper perimeter of the container and a remaining lower portion that is narrower than the container, said cup made of a heat transmitting material, and said cup being sufficiently rigid to withstand penetration of salt water into the interior of the cup, the cup being in sufficient contact with the water so as to absorb heat from the water at least when the container assembly is turned upside down,
- the lower compartment being bounded above by a pierceable partition made of foil material,
- an annular central divider perpendicular to the bottom and having a sufficiently sharp upper edge for piercing the partition when a manual pressure is applied upwardly to a central portion of the flexible bottom sufficient to deform the bottom,
- a salt compound stored in the lower compartment between the anular central divider and a lower compartment outer wall, in a second amount defined in proportion to the first amount of water and sufficient to heat the quantity of the particular beverage to a specified temperature that is ideal for consumption when the salt mixes with the water after the partition of foil material is pierced and the container assembly is turned upside down and shaken, wherein the salt compound fills the lower compartment to a top of the lower compartment.

* * * * *